(12) United States Patent
Komori

(10) Patent No.: US 12,030,449 B2
(45) Date of Patent: Jul. 9, 2024

(54) VEHICLE AND CONTROL METHOD

(71) Applicant: HONDA MOTOR CO., LTD., Tokyo (JP)

(72) Inventor: Kenji Komori, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 15 days.

(21) Appl. No.: 17/950,515

(22) Filed: Sep. 22, 2022

(65) Prior Publication Data

US 2023/0096248 A1 Mar. 30, 2023

(30) Foreign Application Priority Data

Sep. 30, 2021 (JP) ................ 2021-161929

(51) Int. Cl.
| | |
|---|---|
| *B60R 21/0134* | (2006.01) |
| *B60R 21/0136* | (2006.01) |
| *B60R 21/01* | (2006.01) |
| *B60R 22/44* | (2006.01) |
| *B60R 22/46* | (2006.01) |

(52) U.S. Cl.
CPC ...... *B60R 21/0134* (2013.01); *B60R 21/0136* (2013.01); *B60R 2021/01272* (2013.01); *B60R 2022/4473* (2013.01); *B60R 2022/4666* (2013.01)

(58) Field of Classification Search
CPC ............ B60R 21/0134; B60R 21/0136; B60R 2021/01013; B60R 2021/01272; B60R 2021/01265; B60R 22/343; B60R 2022/4473; B60R 2022/4666
See application file for complete search history.

(56) References Cited

U.S. PATENT DOCUMENTS

| | | | |
|---|---|---|---|
| 2008/0238075 A1 | 10/2008 | Bullinger et al. | |
| 2020/0001813 A1* | 1/2020 | Akaba ............... | B60R 21/01554 |

FOREIGN PATENT DOCUMENTS

| | | | | |
|---|---|---|---|---|
| EP | 1445155 A1 | 8/2004 | | |
| JP | 2000-247211 A | 9/2000 | | |
| JP | 2002234418 A | * 8/2002 | ........... | B60R 21/013 |
| JP | 2004-237798 A | 8/2004 | | |
| JP | 2007076389 A | * 3/2007 | | |
| JP | 2008-077309 A | 4/2008 | | |
| JP | 2009-527394 A | 7/2009 | | |
| JP | 2011-235821 A | 11/2011 | | |

OTHER PUBLICATIONS

Japanese Office Action for Japanese Patent Application No. 2021-161929 mailed Apr. 15, 2024 (partially translated).

* cited by examiner

*Primary Examiner* — Hung Q Nguyen
*Assistant Examiner* — Mark L. Greene
(74) *Attorney, Agent, or Firm* — Thomas| Horstemeyer, LLP

(57) ABSTRACT

A vehicle comprises a motor configured to wind a seat belt provided in the vehicle; a first detection unit configured to detect a following vehicle while the vehicle is traveling; a second detection unit configured to detect a preceding vehicle while the vehicle is traveling; a determination unit configured to determine a risk that the following vehicle that is detected by the first detection unit will collide with the vehicle; and a control unit configured to control winding of the seat belt by changing a winding speed of the seat belt by the motor in a case when the determination unit determines that there is the risk.

10 Claims, 8 Drawing Sheets

VEHICLE AND CONTROL METHOD

CROSS-REFERENCE TO RELATED APPLICATION(S)

This application claims priority to and the benefit of Japanese Patent Application No. 2021-161929 filed on Sep. 30, 2021, the entire disclosure of which is incorporated herein by reference.

BACKGROUND OF THE INVENTION

Field of the Invention

The present invention relates to a vehicle and a control method of a motor seat belt.

Description of the Related Art

A method for controlling a self-vehicle, based on information from vehicles ahead of and behind the self-vehicle, is known. For example, Japanese Patent Laid-Open No. 2008-77309 proposes a vehicle control device that appropriately controls the self-vehicle to avoid danger in accordance with a relationship with vehicles located ahead of and behind the self-vehicle. In addition, Japanese Patent Laid-Open No. 2009-527394 proposes a method for controlling a seat belt pretensioner of the vehicle, when identifying a driver's reaction to a critical situation.

In the above related art, controlling the pretensioner of the seat belt in accordance with a risk degree while the driver is driving has been proposed. However, in the above related art, no consideration is given to detection of the risk of an accident in accordance with a surrounding situation of the traveling vehicle and controlling the seat belt in accordance with a detection result. Sensing the risk of an accident and controlling the seat belt in advance is effective for reducing an injury to an occupant (Hereinafter, it is referred to as "injury value") when an accident occurs.

SUMMARY OF THE INVENTION

The present invention has an object to control winding seat belts in accordance with a risk of an accident based on a surrounding situation of a vehicle.

According to the present invention, a vehicle comprises a motor configured to wind a seat belt provided in the vehicle; a first detection unit configured to detect a following vehicle while the vehicle is traveling; a second detection unit configured to detect a preceding vehicle while the vehicle is traveling; a determination unit configured to determine a risk that the following vehicle that is detected by the first detection unit will collide with the vehicle; and a control unit configured to control winding of the seat belt by changing a winding speed of the seat belt by the motor in a case when the determination unit determines that there is the risk.

Further features of the present invention will become apparent from the following description of exemplary embodiments (with reference to the attached drawings).

DESCRIPTION OF THE EMBODIMENTS

Figure 1:
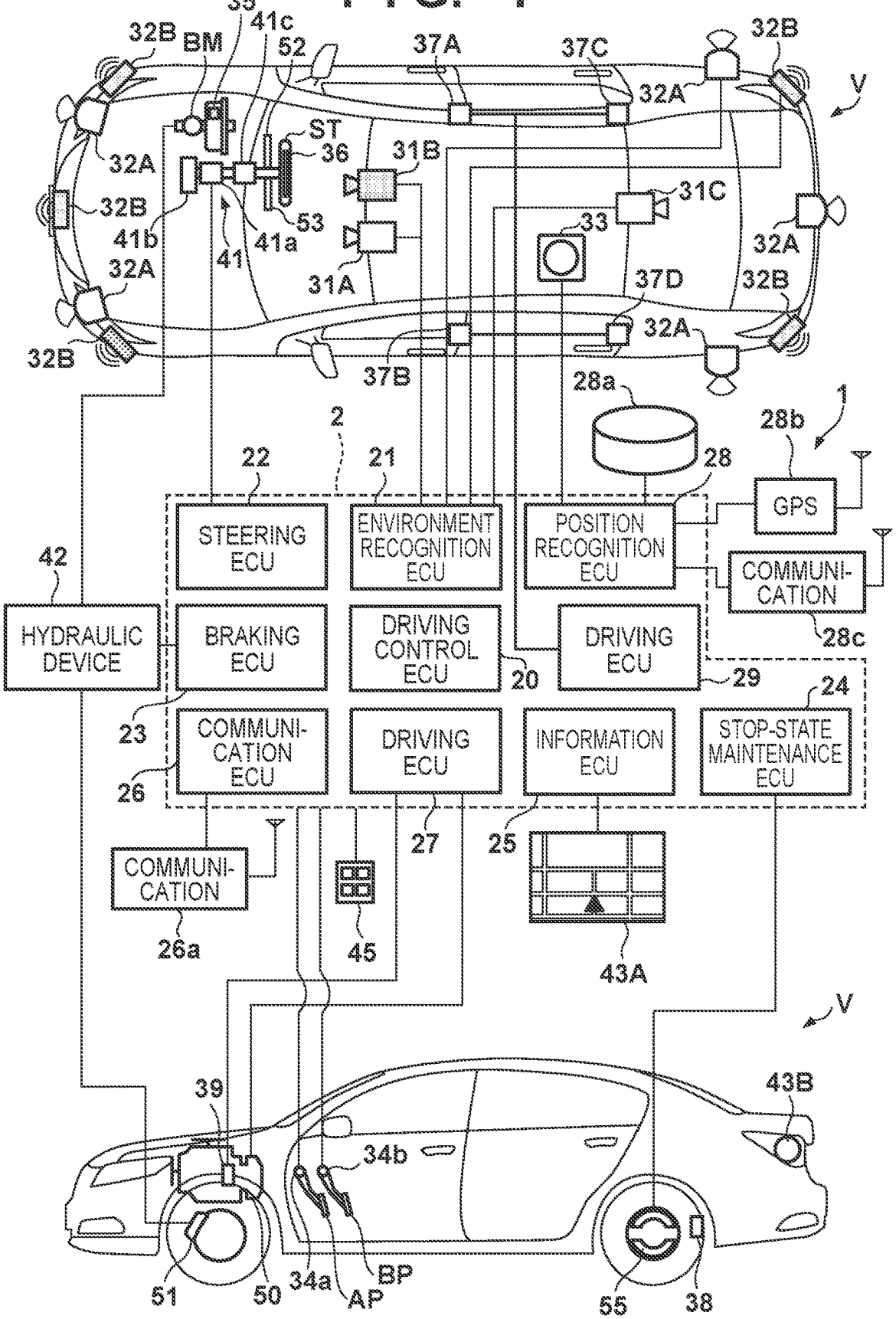
FIG. 1 is a block diagram of a vehicle and a control device according to an embodiment.

Hereinafter, embodiments will be described in detail with reference to the attached drawings. Note that the following embodiments are not intended to limit the scope of the claimed invention, and limitation is not made an invention that requires all combinations of features described in the embodiments. Two or more of the multiple features described in the embodiments may be combined as appropriate. Furthermore, the same reference numerals are given to the same or similar configurations, and redundant description thereof is omitted.

First Embodiment

FIG. 1 is a block diagram of a vehicle V and a control device 1 thereof according to an embodiment of the present invention. In FIG. 1, the vehicle V is schematically illustrated in a plan view and a side view. The vehicle V is, for example, a four-wheeled passenger vehicle of a sedan type.

The vehicle V in the present embodiment is, for example, a parallel hybrid vehicle. In this case, a power plant 50, which is a unit that drives travel and that outputs a driving force for rotating drive wheels of the vehicle V, can include an internal combustion engine, a motor, and an automatic transmission. The motor can be used as a drive source for accelerating the vehicle V, and can also be used as a generator at the time of deceleration or the like (regenerative braking).

<Control Device>

A configuration of the control device 1, which is a device mounted on the vehicle V, will be described with reference to FIG. 1. The control device 1 includes an ECU group (control unit group) 2. The ECU group 2 includes a plurality of ECUs 20 to 29 configured to be capable of communicating with one another. Each ECU includes a processor represented by a CPU, a storage device such as a semiconductor memory or the like, an interface with an external device, and the like. The storage device stores programs executed by the processor, data used by the processor for processing, and the like. Each ECU may include a plurality of processors, storage devices, interfaces, and the like. Note that the number of ECUs and the functions assigned to the ECUs can be designed as appropriate, and can be subdivided or integrated, when compared with those in the present embodiment. Note that, in FIG. 1, names of representative functions of the ECUs 20 to 29 are given. For example, the ECU 20 is expressed as "driving control ECU".

The ECU 20 conducts control related to driving assistance including automated driving of the vehicle V and control of a motor seat belt (hereinafter, simply referred to as a "seat belt"). In the automated driving, driving (acceleration or the like of the vehicle V by the power plant 50), steering, and braking of the vehicle V are automatically conducted without necessitating a driver's operation. In addition, the ECU 20 is capable of conducting, for example, traveling assist control such as collision mitigation brake and lane deviation suppression, in manual driving. In the collision mitigation brake, an instruction to activate brake devices 51 is issued, in a case where the possibility of a collision with an obstacle that is present ahead increases, so as to assist collision avoidance. Regarding the lane deviation suppression, in a case where the possibility that the vehicle V deviates from a lane increases, an instruction to activate an electric power steering device 41 is issued to assist the lane deviation avoidance. Further, the ECU 20 is capable of conducting automated following control for causing the vehicle V to automatically follow a preceding vehicle in both automated driving and manual driving. In the case of automated driving, all of acceleration, deceleration, and steering of the vehicle V may be automatically performed. In the case of manual driving, acceleration and deceleration of the vehicle V may be automatically performed.

Further, the ECU 20 identifies a surrounding situation of the vehicle V by use of outputs from various detection units to be described later, and determines a risk of an occurrence of an accident. Furthermore, the ECU 20 causes the ECU 29 to control the motors 37A to 37D of the motor seat belts provided for the respective seats in accordance with a determination result of the risk so as to adjust the bending of the seat belts. For example, in a case where the risk of an accident is high, the ECU 20 controls the ECU 29 to wind the motor seat belt and eliminate the bending of the seat belt, and prevents the occupant from flying out of the vehicle when the accident occurs, and in addition, corrects the posture of the occupant to reduce an injury value of the occupant. The ECU 29 controls the driving of the motors 37A to 37D, and thus is capable of winding or loosening the seat belts. In addition, the ECU 29 controls the rotation speeds of the motors 37A to 37D, and thus is capable of changing the winding speeds. Further, the ECU 29 controls the motors 37A to 37D together with the winding speeds, and thus is also capable of changing the tensile strength of the seat belts.

The ECU 21 is an environment recognition unit that recognizes a traveling environment of the vehicle V, based on detection results of detection units 31A, 31B, 31C, 32A, and 32B that detect surrounding situations of the vehicle V. In the present embodiment, the detection units 31A and 31B are cameras that capture images present on a front side of the vehicle V (hereinafter, referred to as the camera 31A and the camera 31B, in some cases), and are attached to the vehicle cabin interior of a windshield in a front part of a roof of the vehicle V. The detection unit 31C is a camera that captures an image on a rear side of the vehicle V (hereinafter, referred to as the camera 31C, in some cases), and is attached to the vehicle cabin interior of a rear window in a rear part of the roof of the vehicle V. By analyzing the images that have been captured by the cameras 31A to 31C, it becomes possible to extract a contour of a target object or a lane division line (white line or the like) of a lane on a road.

In the present embodiment, the detection unit 32A is a Light Detection and Ranging (LiDAR) (hereinafter, referred to as a LiDAR 32A, in some cases), detects a target object in the surroundings of the vehicle V, and measures a distance to the target object. In the present embodiment, five LiDARs 32A are provided, including one at each corner portion of a front part of the vehicle V, one at the center of a rear part of the vehicle V, and one at each lateral side of the rear part of the vehicle V. The detection unit 32B is a millimeter-wave radar (hereinafter, referred to as the radar 32B, in some cases), detects a target object in the surroundings of the vehicle V, and measures a distance to the target object. In the present embodiment, five radars 32B are provided, including one at the center of the front part of the vehicle V, one at each corner portion of the front part of the vehicle V, and one at each corner portion of the rear part of the vehicle V. These detection units are not limited to the sensors described in the embodiments, and an ultrasonic sonar, a camera, or the like may be used.

The ECU 21 detects a preceding vehicle and a following vehicle with respect to the vehicle V, based on the detection results of these detection units 31A, 31B, 31C, 32A, and 32B, predicts their speeds, and notifies the ECU 20 of the predicted speeds. The ECU 20 acquires a distance to the preceding vehicle and a time to collision (TTC) with the vehicle V of the following vehicle, based on the detection results from the ECU 21.

The ECU 22 is a steering control unit that controls the electric power steering device 41. The electric power steering device 41 includes a mechanism that steers front wheels in response to a driver's driving operation (steering operation) on a steering wheel ST. The electric power steering device 41 includes a driving unit 41a including a motor that exerts driving force for assisting a steering operation or automatically steering the front wheels (referred to as steering assist torque, in some cases), a steering angle sensor 41b, a torque sensor 41c that detects steering torque burdened by the driver (referred to as steering burden torque to be distinguished from steering assist torque). The ECU 22 is also capable of acquiring a detection result by a sensor 36, which detects whether the driver grips the steering wheel ST, and is capable of monitoring the driver's gripping state.

Blinker levers 52 and 53 are provided in the vicinity of the steering wheel ST. The occupant operates the blinker levers 52 and 53, and thus is capable of activating corresponding left and right direction indicators (not illustrated). In addition, in the present embodiment, by operating the blinker levers 52 and 53, the occupant is able to issue an instruction for an automated course change of the vehicle V. As the instruction for the automated course change, for example, by operating the blinker lever 53, the occupant is able to instruct a lane change to a lane on the left side, and by operating the blinker lever 52, the occupant is able to instruct a lane change to a lane on the right side. The instruction by the occupant for the course change may be acceptable during automated driving or automated following control.

The ECU 23 is a braking control unit that controls a hydraulic device 42. The driver's braking operation on a brake pedal BP is converted into hydraulic pressure in a brake master cylinder BM, and is transmitted to the hydraulic device 42. The hydraulic device 42 is an actuator capable of controlling the hydraulic pressure of hydraulic oil to be supplied to the brake device (for example, a disc brake device) 51 provided on each of the four wheels, based on the hydraulic pressure that has been transmitted from the brake master cylinder BM, and the ECU 23 controls the driving of an electromagnetic valve and the like included in the hydraulic device 42. The ECU 23 is also capable of turning on brake lamps 43B at the time of braking. This enables the following vehicle to give more attention to the vehicle V.

The ECU 23 and the hydraulic device 42 are capable of constituting an electric servo brake. The ECU 23 is capable of controlling, for example, the distribution of the braking force by the four brake devices 51 and the braking force by the regenerative braking of the motor included in the power plant 50. The ECU 23 is also capable of achieving an ABS function, traction control, and a posture control function of the vehicle V, based on detection results of wheel speed sensors 38 provided for the respective four wheels, a yaw rate sensor (not illustrated), and a pressure sensor 35 that detects the pressure in the brake master cylinder BM.

The ECU 24 is a stop-state maintenance control unit that controls electric parking brake devices (for example, drum brakes) 55 provided on the rear wheels. The electric parking brake devices 55 each include a mechanism for locking the rear wheel. The ECU 24 is capable of controlling locking and unlocking of the rear wheels by the electric parking brake devices 55.

The ECU 25 is an in-vehicle notification control unit that controls an information output device 43A, which notifies the vehicle inside of information. The information output device 43A includes, for example, a display device provided on a heads-up display or an instrument panel, or a sound output device. The information output device 43A may further include a vibration device. The ECU 25 causes the information output device 43A to output, for example, various kinds of information such as a vehicle speed and an outside temperature, information such as route guidance, information about a state of the vehicle V, and information about a surrounding situation related to the preceding vehicle and the following vehicle with respect to the vehicle V.

The ECU 26 includes a communication device 26*a* for vehicle-to-vehicle communication. The communication device 26*a* performs wireless communication with another vehicle in the surroundings to exchange information between the vehicles.

The ECU 27 is a driving control unit that controls the power plant 50. In the present embodiment, one ECU 27 is assigned to the power plant 50, but one ECU may be assigned to each the internal combustion engine, the motor, and the automatic transmission. For example, the ECU 27 controls an output of the internal combustion engine or the motor, or switches a gear ratio of the automatic transmission in accordance with the driver's driving operation, the vehicle speed, and the like that have been detected by an operation detection sensor 34*a* provided in an accelerator pedal AP and an operation detection sensor 34*b* provided in the brake pedal BP. Note that the automatic transmission includes a rotation speed sensor 39, which detects the rotation speed of an output shaft of the automatic transmission, as a sensor that detects a traveling state of the vehicle V. It is possible to calculate the vehicle speed of the vehicle V from a result of detection by the rotation speed sensor 39.

The ECU 28 is a position recognition unit that recognizes a current position and a course of the vehicle V. The ECU 28 controls a gyro sensor 33, a GPS sensor 28*b*, and a communication device 28*c*, and performs information processing on a detection result or a communication result. The gyro sensor 33 detects a rotational motion of the vehicle V. It is possible to determine the course of the vehicle V from the detection result of the gyro sensor 33 and the like. The GPS sensor 28*b* detects the current position of the vehicle V. The communication device 28*c* performs wireless communication with a server that provides map information and traffic information, and acquires these pieces of information. It is possible to store map information with high accuracy in a database 28*a*, so the ECU 28 is capable of identifying the position of the vehicle V on a lane with higher accuracy, based on such map information and the like.

An input device 45 is disposed inside the vehicle to be operable by the driver, and accepts an input of an instruction and information from the driver.

Control Example

As a driving control mode of the vehicle V, the control device 1 is capable of switching between an automated driving mode and a manual driving mode in accordance with an instruction from an occupant, for example. In the automated driving mode, automated driving control of the vehicle V is conducted. In the automated driving control, the ECU 20 sets an action plan of the vehicle V, outputs a control command to the ECU 22, the ECU 23, and the ECU 27 in accordance with the action plan that has been set, controls steering, braking, and driving of the vehicle V, and causes the vehicle V to automatically travel without depending on the driving operation of the driver. The ECU 20 sets a travel route of the vehicle V, and causes the vehicle V to travel along the travel route that has been set with reference to a position recognition result of the ECU 28 and a recognition result of the target object.

In a case where the occupant instructs a destination, the route guidance for guiding the vehicle V to the destination is conducted. The target object is recognized, based on the detection results of the detection units 31A, 31B, 32A, and 32B. When it becomes possible to follow a preceding vehicle while traveling on an expressway or the like, the automated following control is enabled, and the vehicle V automatically follows the preceding vehicle, in the automated following control. Also during the manual driving control, the automated following control is enabled as one type of driving assist control.

Figure 2:
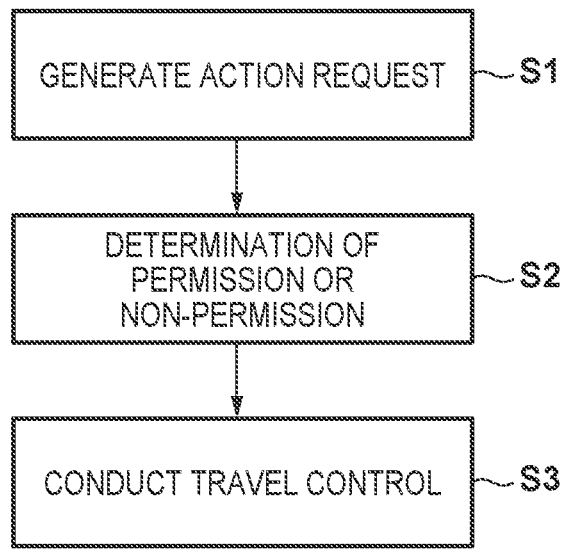
FIG. 2 is a flowchart illustrating an example of a process performed by the control device for the vehicle of FIG. 1.

FIG. 2 illustrates a flow of control repeatedly conducted by the ECU 20 in such automated traveling of the vehicle V. In S1, an action request is generated. The operation request includes an action request generated by a system side and an action request generated by an instruction from an occupant. The action request generated by the system side includes, for example, acceleration, deceleration, right/left turning, passing of a preceding vehicle, a lane change, and the like for the ECU 20 to conduct the action plan. The action request generated by the instruction from the occupant includes, for example, an instruction of an operation input by the occupant.

In S2, whether to permit the action request generated in S1 is determined. In determination of permission or non-permission, for example, whether it is possible to conduct the action request generated in S1 is determined with reference to a position recognition result of the vehicle, a traveling road, and a recognition result of a target object. In a case where it is determined that it is possible to conduct the travel control, the travel control corresponding to the action request of S1 is conducted in S3. Here, a control command is output to the ECU 22, the ECU 23, and the ECU 27 to control steering, braking, and driving of the vehicle V.

<Functional Configuration Related to Seat Belt Control>

Figure 3:
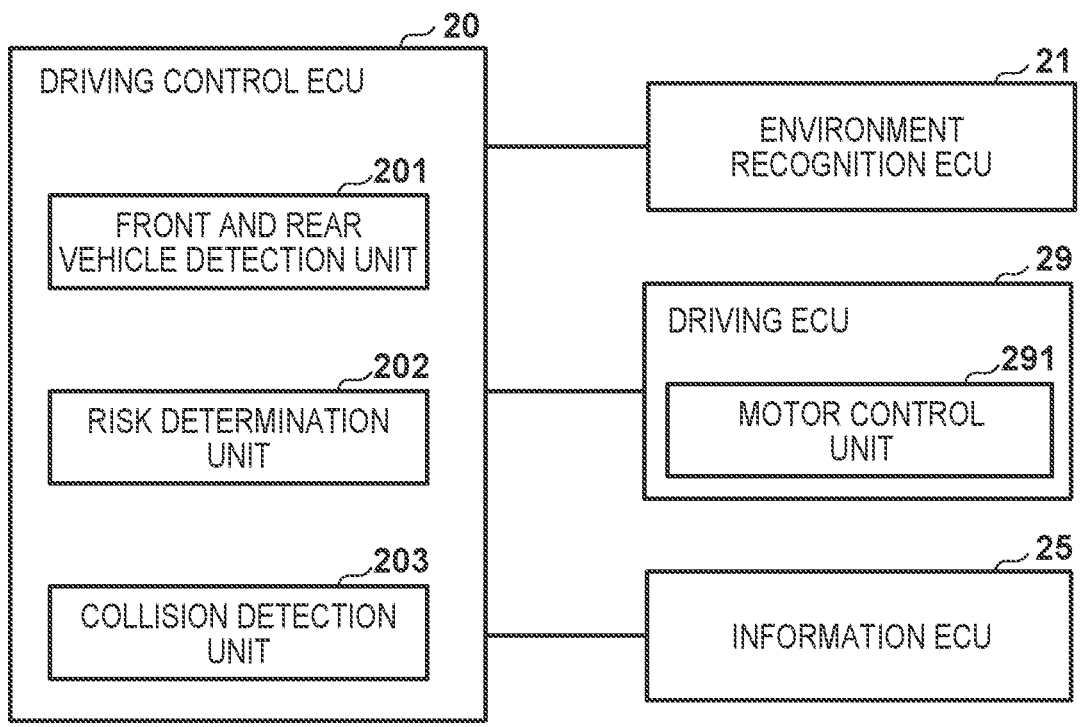
FIG. 3 is a detailed functional block diagram of the control device related to seat belt control.

A detailed functional configuration related to the seat belt control in the control device 1 will be described with reference to FIG. 3. Here, the ECU mainly involved in the seat belt control according to the present embodiment will be described, and descriptions of the other ECUs will be omitted. However, any other ECUs not individually described may also be configured to be involved in the seat belt control as necessary.

The ECU 20 includes a front and rear vehicle detection unit 201, a risk determination unit 202, and a collision detection unit 203. In addition, the ECU 29 also includes a motor control unit 291. First, the ECU 21 acquires surrounding situations using the detection units 31A, 31B, 31C, 32A, and 32B, and notifies the ECU 20 of the surrounding situations that have been acquired. The front and rear vehicle detection unit 201 of the ECU 20 detects a preceding vehicle traveling on a front side of the vehicle V using the captured images of the cameras 31A and 31B, and further acquires the distance to the preceding vehicle and the speed of the preceding vehicle that has been detected using measurement results of the detection units 32A and 32B. In addition, the front and rear vehicle detection unit 201 detects a following vehicle traveling on a rear side of the vehicle V using the captured image of the camera 31C, and further acquires the distance to the following vehicle and the speed of the following vehicle that has been detected using the measurement results of the detection units 32A and 32B.

The risk determination unit 202 determines a risk that the following vehicle that has been detected will collide with the vehicle V and an accident occurs. The risk determination unit 202 acquires a time to collision (TTC) with the vehicle V by the following vehicle from the moving speed and the distance to the following vehicle, and determines that there is a risk of the occurrence of an accident, when the time to collision that has been acquired is, for example, equal to or shorter than 200 ms in the present embodiment. In the present embodiment, an example of determining whether there is a risk of the occurrence of an accident will be described. However, there is no intention to limit the present invention, and for example, regarding the risk of the occurrence of an accident, a plurality of ranks may be given in accordance with the time to collision. For example, a high risk may be determined when the time to collision is equal to or shorter than 200 ms, a medium risk may be determined when the time to collision is 200 ms to 400 ms, and a low risk may be determined when the time to collision exceeds 400 ms.

In a case where the risk determination unit 202 determines that there is a risk of a collision with the following vehicle, that is, there is a risk of the occurrence of an accident, such a determination is notified to the ECU 29. The motor control unit 291 of the ECU 29 actuates the motors 37A to 37D of the motor seat belts currently used by the occupants in accordance with the information that has been notified, and winds the seat belts to reduce the bending of the seat belts of the occupants. Furthermore, the motor control unit 291 changes the winding speeds of the seat belts in accordance with the presence or absence of the preceding vehicle that has been notified from the ECU 20. Specifically, in a case where a preceding vehicle is present, there is also a risk that the vehicle V will collide with the preceding vehicle due to the collision with the following vehicle. Therefore, in such a case, the motor control unit 291 quickly winds the seat belts. Furthermore, the winding speed may be changed in accordance with the distance between the preceding vehicle and the vehicle V.

The collision detection unit 203 detects a collision with the vehicle V by the following vehicle, based on a detection signal of an acceleration sensor (collision sensor), not illustrated. Note that the acceleration sensors are desirably installed at a plurality of positions inside the housing of the vehicle V, particularly in a rear part. This enables, for example, detection of a rear-end collision with the following vehicle. When detecting the collision with the following vehicle, the collision detection unit 203 notifies the ECU 29 of the collision, and controls the ECU 29 to wind the seat belts again that have been loosened due to the collision.

The ECU 25 may notify that the risk of the occurrence of an accident is increasing due to tailgating or the like of the following vehicle, in accordance with a determination result of the risk determination unit 202. Further, the ECU 25 may notify that the seat belt is being wound in accordance with the determination result.

Figure 6:
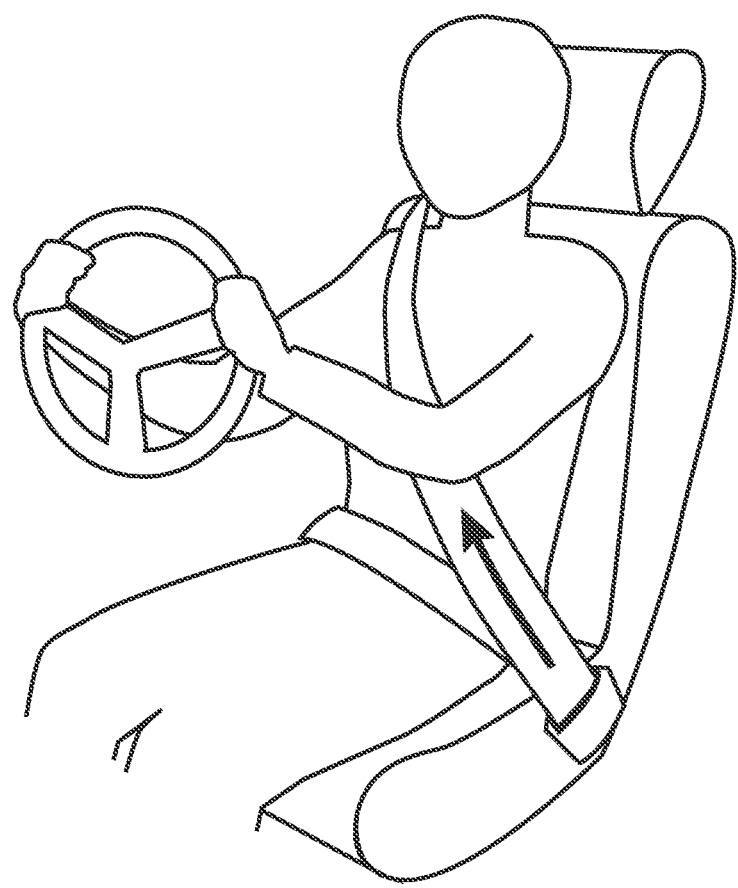
FIG. 6 is a diagram illustrating a seat belt of the vehicle.

The ECU 29 causes the motor control unit 291 to conduct winding control of the seat belt in a direction indicated by an arrow in FIG. 6. Regarding winding of the seat belt, by controlling the rotation speed of the motor, it is possible to change the winding speed of the seat belt. Furthermore, control may be conducted to intermittently wind in order to let the occupant know that the winding control is being conducted. In this case, the winding control is intermittently stopped in order to wind the seat belt in stages.

<Detection of Surrounding Situation>

Figure 4:
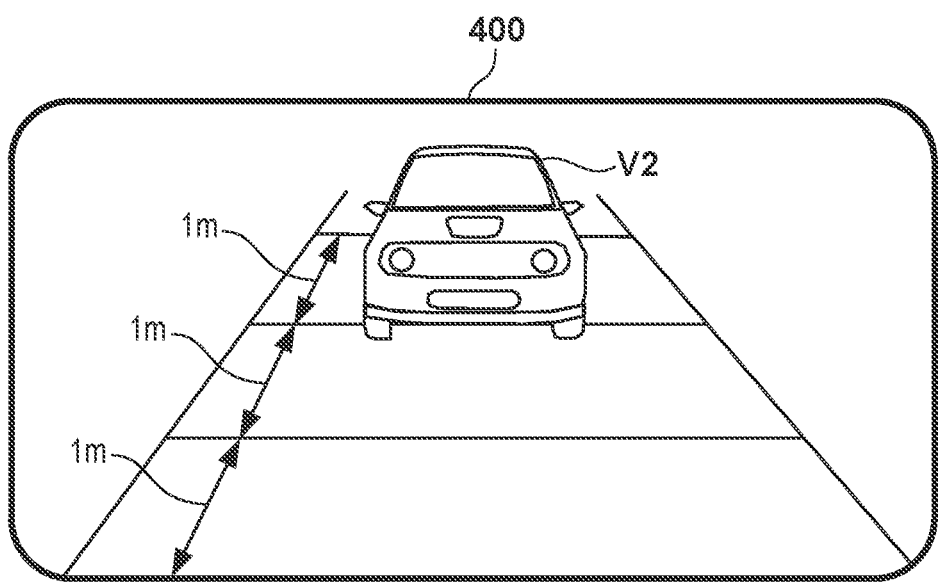
FIG. 4 is a view illustrating a captured image of a following vehicle that has been captured by a camera of the vehicle.

Next, a method for detecting a following vehicle from an image captured by the camera 31C will be described with reference to FIG. 4.

A captured image 400, which has been captured by the camera 31C, includes a vehicle V2, which is a following vehicle. A line drawn every one meter indicates a distance between the vehicle V (hereinafter, referred to as a vehicle V1) and the vehicle V2, which is the following vehicle. Therefore, it can be understood that the vehicle V2 is traveling two meters to three meters on the rear side of the vehicle V1. It is possible to calculate such a distance from the captured image 400. However, the distance to the vehicle V2, which is the following vehicle, may be acquired, based on the measurement results of the detection units 32A and 32B.

In addition, it is possible to predict the speed of the vehicle V2 from the captured image 400 and a cyclerally different captured image (for example, a captured image after one second). There are various methods for acquiring the speed of the vehicle V2, and any method may be used. However, for example, it is possible to predict the speed of the vehicle V2 from the speed of the vehicle V1, which is the self-vehicle, the captured image 400, and a change in the distance to the vehicle V2 acquired from a difference from a subsequently captured image.

Note that the captured image 400 may be displayed on the information output device 43A by the ECU 25, in a case where there is a possibility that the vehicle V2 will collide. In this case, it is desirable to display as a moving image, and further, a message, a mark, or the like indicating danger may be displayed.

<Relationship Between Preceding Vehicle and Following Vehicle>

Figure 5:
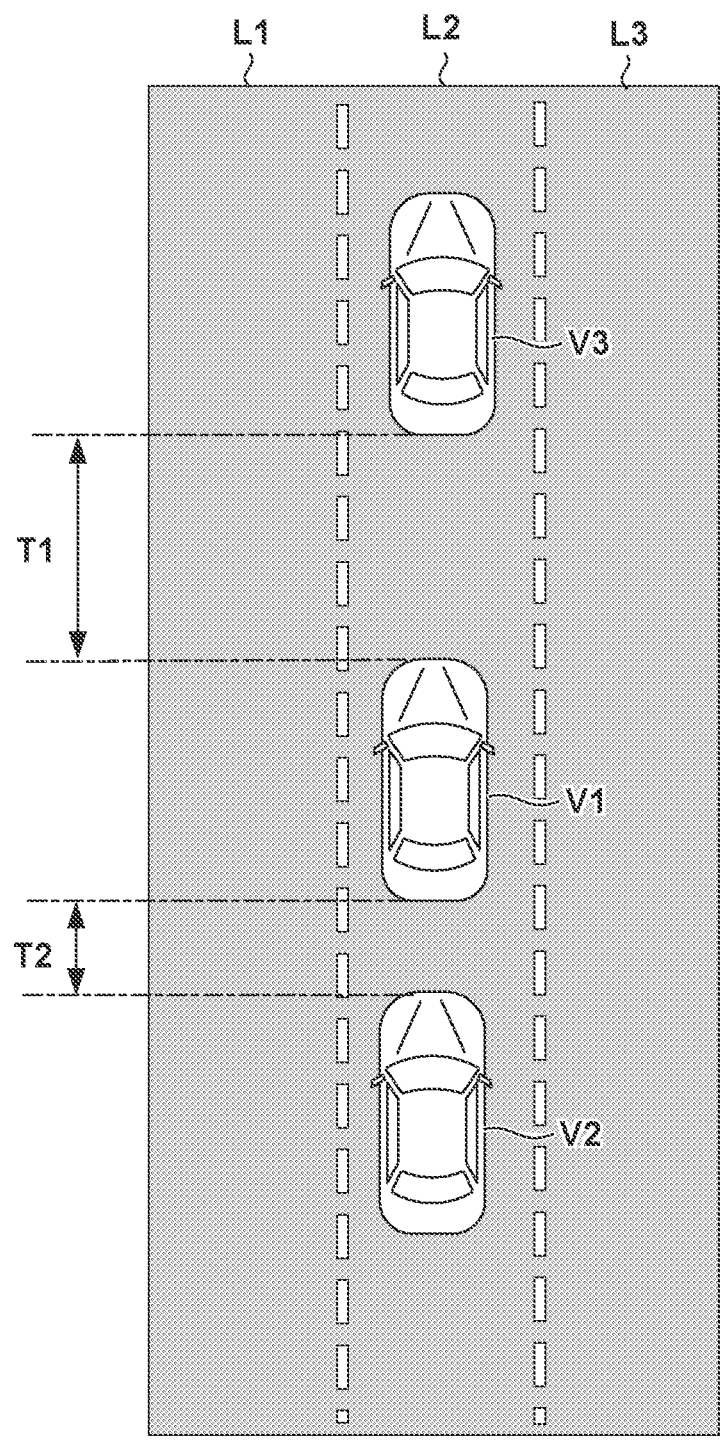
FIG. 5 is a diagram illustrating a relationship between the vehicle, and a preceding vehicle and the following vehicle.

Next, a relationship between the self-vehicle, a preceding vehicle, and a following vehicle in the present embodiment will be described with reference to FIG. 5. V1 indicates the self-vehicle. V2 indicates a following vehicle. V3 indicates a preceding vehicle. All the vehicles V1 to V3 are traveling in an upward direction in the drawing, and are traveling in a lane L2 among the plurality of lanes L1 to L3.

T1 indicates a distance between a front end of the vehicle V1, which is the self-vehicle, and a rear end of the vehicle V3, which is the preceding vehicle. T2 indicates a distance between a rear end of the vehicle V1 and a front end of the vehicle V2, which is the following vehicle. The risk determination unit 202 acquires the above-described time to collision by using the distance T2, the speeds of the vehicles V1 and V2, and the like, and determines the risk of the occurrence of the accident. In addition, in a case where there is the risk of the occurrence of the accident, the winding speed of the seat belt is changed in accordance with the presence or absence of the preceding vehicle. Note that also in a case where the presence of the preceding vehicle is determined, when the distance T1 falls within a predetermined value (for example, within five meters), the presence of the preceding vehicle may be determined. That is, even in a case where a vehicle is present on a front side of the vehicle V1, when the distance exceeds five meters, it does not have to be identified as the preceding vehicle. Further, the above predetermined value may be changed depending on the speed of the vehicle V1.

Here, the description has been given for the preceding vehicle traveling in the same lane. However, the present invention is not limited to this. Any vehicles traveling in different lanes L1 and L3 may be identified as the preceding vehicles. In this case, it is desirable to change the above predetermined value for every lane. For example, the predetermined value may be set to five meters for vehicles in the same lane L2, and the predetermined value may be set to three meters for vehicles in different lanes L1 and L3.

<Process Procedure>

Figure 7:
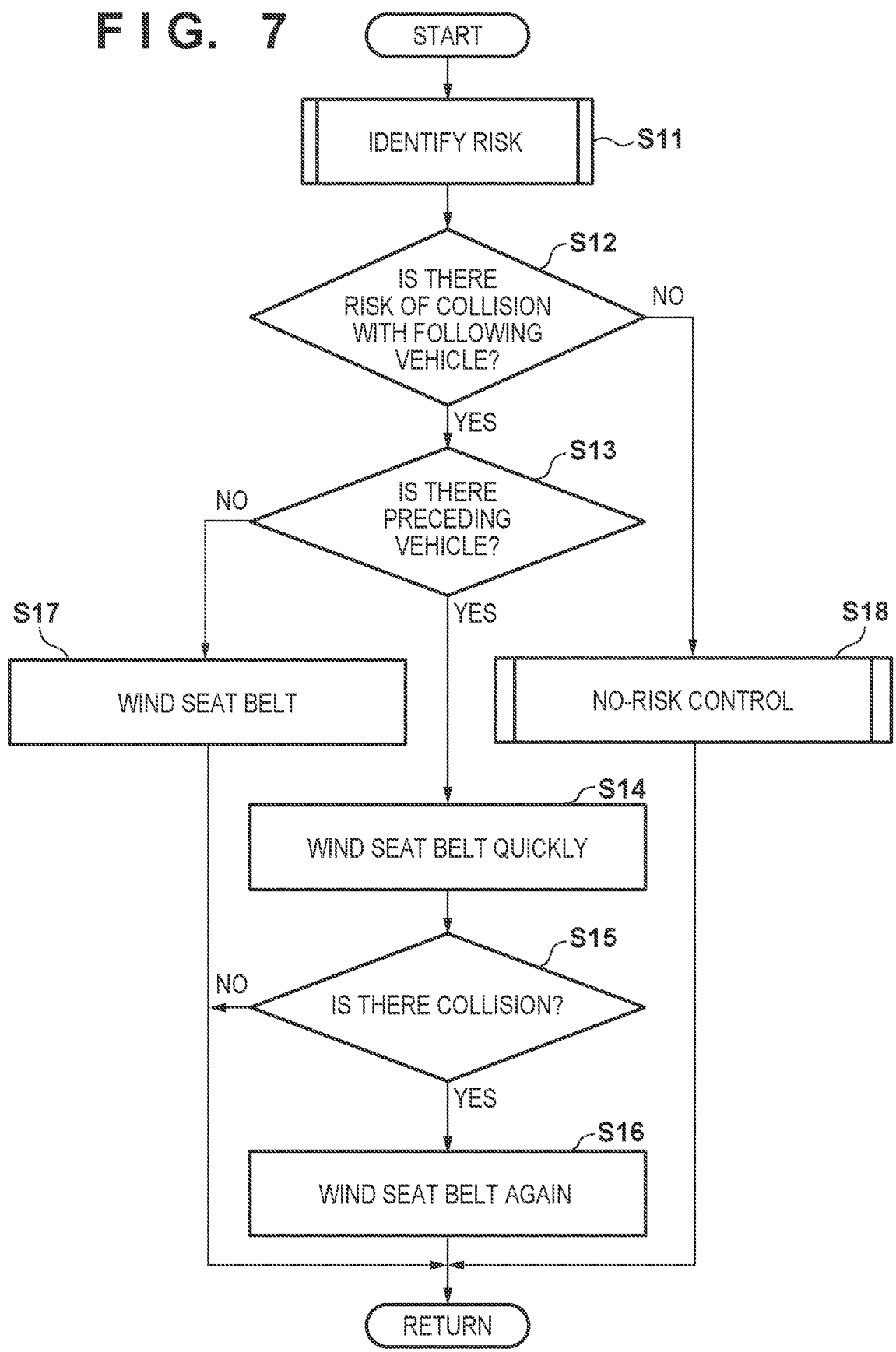
FIG. 7 is a flowchart illustrating a process procedure for conducting winding control of the seat belt in accordance with a surrounding situation of the vehicle.
Figure 8:
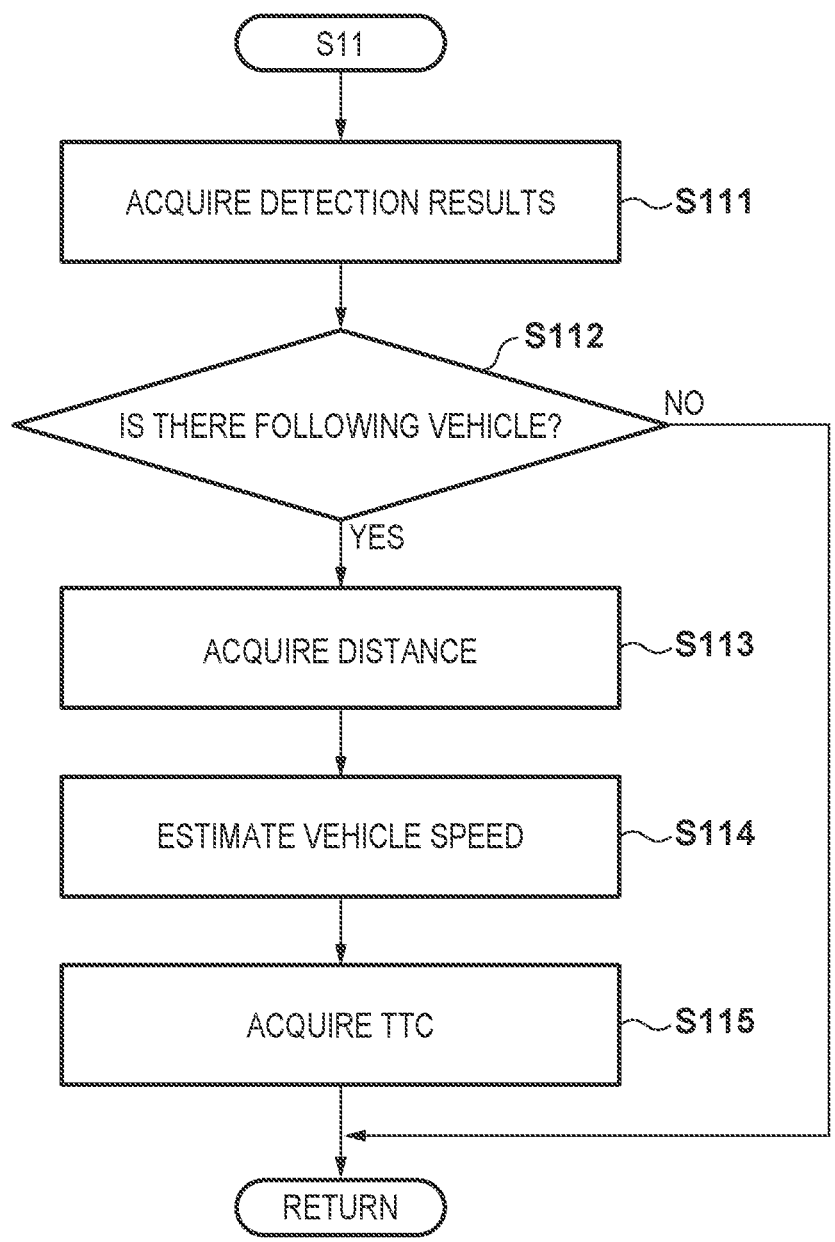
FIG. 8 is a flowchart illustrating a control procedure for identifying a risk of an accident.
Figure 9:
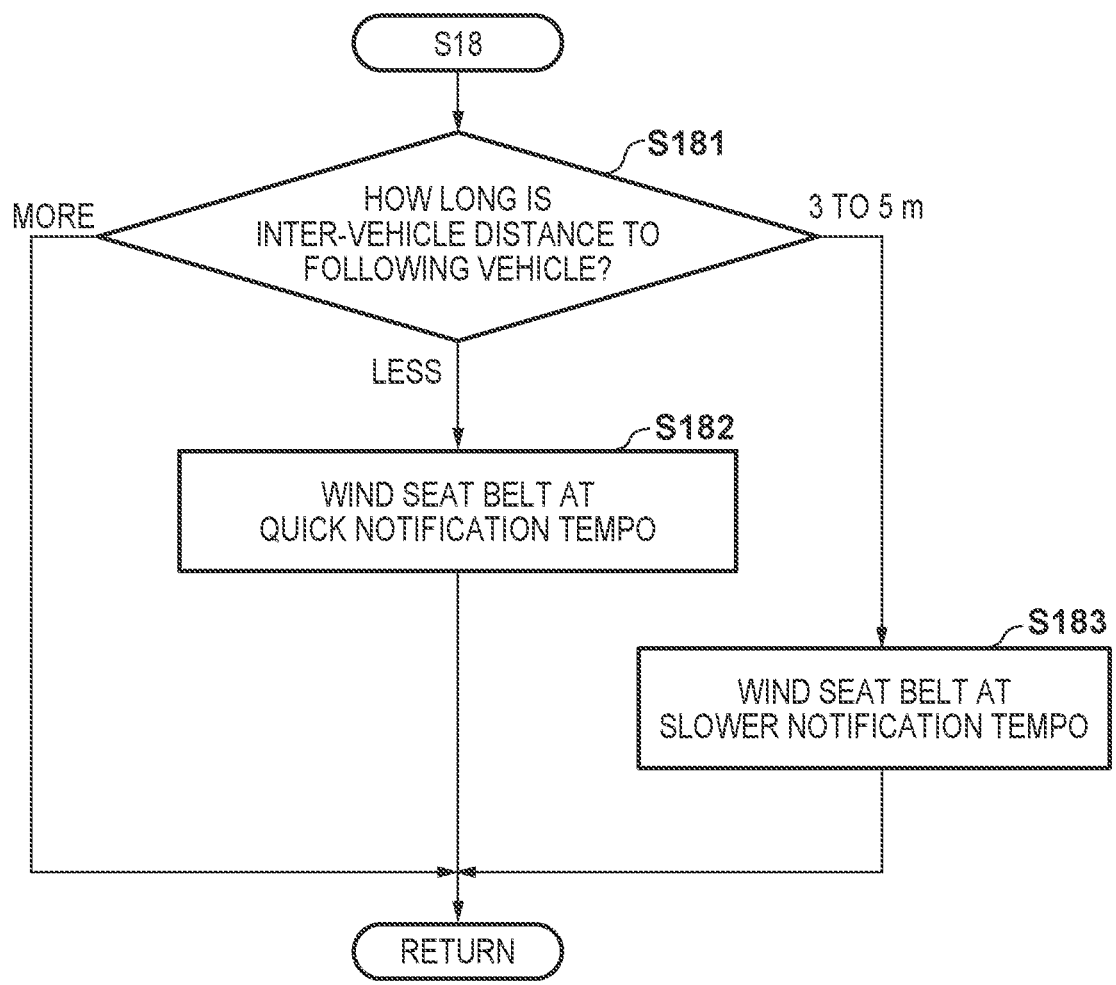
FIG. 9 is a flowchart illustrating a control procedure in a case where the risk of the accident is low.

Next, with reference to FIGS. 7 to 9, a description will be given for a process procedure of the winding control of the seat belt in accordance with a surrounding situation of the vehicle according to the present embodiment. FIG. 7 illustrates a basic flow, and FIGS. 8 and 9 illustrate sub-flows of FIG. 7. The present flowchart is a process procedure performed while the vehicle V is traveling.

(Main Flow)

A basic flow will be described with reference to FIG. 7. First, in S11, the ECU 20 identifies a risk of the vehicle V that is traveling. In the present embodiment, as the risk of the vehicle V, a time to collision (TTC) is calculated to identify a risk that a vehicle following the vehicle V will collide with the vehicle V. Details of the process in S11 will be described later with reference to FIG. 8. Subsequently, in S12, the ECU 20 determines whether there is a risk of a collision with the following vehicle, based on the TTC acquired in S11. Here, for example, in a case where the TTC is equal to or shorter than 200 ms, it is determined that there is the risk of the collision with the following vehicle. This value is set from the viewpoint of preventing erroneous detection, but may vary depending on vehicle performance or other environmental information. In a case where it is determined that there is a risk, the process proceeds to S13, whereas in the other case, the process proceeds to S18. In step S18, the ECU 20 conducts control in a case where there is no risk, and ends the process. A detailed process in S18 will be described later using FIG. 9.

On the other hand, in S13, the ECU 20 determines the presence or absence of a preceding vehicle of the vehicle V in accordance with the detection information from the ECU 21. Here, in a case where the distance between the vehicle V and the preceding vehicle falls within a predetermined value (for example, within five meters or within one second of TTC), the presence of the preceding vehicle is determined, whereas in a case where the distance is longer than that, the absence of the preceding vehicle may be determined. In addition, the above predetermined value may be changed depending on whether the preceding vehicle is traveling in the same lane with the vehicle V or the preceding vehicle is traveling in a different lane. For example, the distance may be set to five meters, in the case of the same lane, and may be set to three meters in the case of the different lane. In a case where the presence of the preceding vehicle is determined, the process proceeds to S14, whereas in the other case, the process proceeds to S17.

In S17, the ECU 20 gives an instruction to the ECU 29 to wind the seat belt at a normal speed. When the ECU 29 receives such an instruction, the motor control unit 291 controls the motor of the seat belt to wind the seat belt at the normal speed. Accordingly, it is possible to restrain the occupant who wears the seat belt in a stronger manner, and it is possible to reduce an injury value of the occupant when the following vehicle collides. Note that also in this case, all the seat belts of the seats on which the occupants are seated are wound. When the winding process of winding the seat belt ends, the process of this flowchart ends.

On the other hand, in a case where the presence of the preceding vehicle is determined, the ECU 20 gives an instruction to the ECU 29 in S14 to perform the winding process of the seat belt at a higher speed than in winding the seat belt at the normal speed in S17. When the ECU 29 receives such an instruction, the motor control unit 291 controls the motor of the seat belt at a rotation speed faster than the rotation speed of the motor in S17, and winds the seat belt at a high speed. This is conducted in consideration of the risk that, when the following vehicle will collide with the vehicle V, the vehicle V will be pushed forward by an impact of the collision, and further collide with the preceding vehicle. In other words, the seat belt is wound early on the assumption of multiple accidents.

Next, in S15, the ECU 20 determines whether a collision with the vehicle V by the following vehicle has occurred. In a case where no collision occurs, the process of this flowchart ends. On the other hand, in a case where the occurrence of a collision is determined, the process proceeds to S16, and the ECU 20 gives an instruction to the ECU 29 to wind the seat belt again. When the ECU 29 receives such an instruction, the motor control unit 291 controls the motor of the seat belt to wind the seat belt again. This is the control for eliminating bending when the seat belt is loosened due to the collision and reducing an injury value of the occupant when the vehicle further collides with the preceding vehicle. Note that also with regard to the winding speed here, winding at a higher speed is desirable. When the winding of the seat belt again ends, the process of this flowchart ends.

(Identification of Risk)

Subsequently, a risk identification process in S11 will be described with reference to FIG. 8. First, in S111, the ECU 20 acquires detection results that have been acquired from the ECU 21 using the detection units 31A, 31B, 31C, 32A, and 32B. The detection results include captured images of the cameras 31A, 31B, and 31C and information of the distance to a predetermined object (here, for example, a preceding vehicle or a following vehicle) by the detection units 32A and 32B. Note that there is no intention to limit the present invention, and other environmental information may be included.

Next, in S112, the ECU 20 determines the presence or absence of a following vehicle of the vehicle V, based on the information acquired in S111. For example, the presence or absence of the following vehicle is determined from the captured image of the camera 31C. Note that it is possible to determine the presence or absence of the preceding vehicle from the captured images of the cameras 31A and 31B. In a case where the following vehicle is present, the process proceeds to S113, whereas in the other case, the process of this flowchart ends, and the process returns to the main flow.

In S113, the ECU 20 acquires the distance between the vehicle V and the following vehicle that has been detected from the information of the detection units 32A and 32B. Note that in the vehicle in which neither the detection unit 32A nor 32B is provided, the distance to the following vehicle may be acquired from the captured image of the camera 31C. Subsequently, in S114, the ECU 20 estimates the vehicle speed of the following vehicle from the information acquired in S111 and the speed of the self-vehicle. Furthermore, in S115, the ECU 20 acquires the time to collision by using the distance to the following vehicle acquired in S113 and S114 and the vehicle speed of the following vehicle, ends the process of this flowchart, and returns the process to the main flow.

(No-Risk Control)

Subsequently, no-risk control in S18 will be described with reference to FIG. 9. Here, the control in a case where the risk of an accident is low will be described. Even in a case where it is determined from the TTC that the risk of an accident is low, there is a risk of the occurrence of an accident regardless of the TTC, if the following vehicle is tailgating or the like. Therefore, here, a description will be given for a mechanism of notifying the occupant that the following vehicle is tailgating, while winding the seat belt in accordance with an inter-vehicle distance with the following vehicle. Note that whether the tailgating is being done may be determined from a camera image or the like. However, here, a description will be given for an example in which the winding control of the seat belt is simply conducted in accordance with the inter-vehicle distance with the following vehicle, regardless of whether the tailgating is being done. Note that there is no intention to limit the present invention, and the process to be described below may be performed in consideration of a determination result in the determination as to whether the tailgating is being done.

First, in S181, the ECU 20 determines the inter-vehicle distance between the vehicle V and the following vehicle, based on the detection information from the ECU 21. Here, as an example, the determination is individually made for a case where the inter-vehicle distance is shorter than three meters, a case where the inter-vehicle distance is three meters to five meters, and a case where the inter-vehicle distance is longer than five meters. In the case where the inter-vehicle distance is longer than five meters, the process of this flowchart ends without particularly performing the winding process of the seat belt, and the process returns to the main flow. In addition, in the case where the inter-vehicle distance is shorter than three meters, the process proceeds to S182, and the ECU 20 intermittently winds the seat belt at a quick notification cycle, ends the process of this flowchart, and returns the process to the main flow. Furthermore, in the case where the inter-vehicle distance is between three meters to five meters, the process proceeds to S183, and the ECU 20 intermittently winds the seat belt at a slower cycle than that in S182, ends the process of this flowchart, and returns the process to the main flow. As described above, according to the present embodiment, even in the case where no risk is determined, the seat belt is wound in accordance with the inter-vehicle distance with the following vehicle, and the winding is conducted intermittently to notify the occupant of the risk. Accordingly, the occupant is able to sense the risk in advance, take safer measures, and avoid an accident, for example.

Summary of Embodiments

The above embodiments disclose at least the following embodiments.

The vehicle (for example, V) of the above embodiments comprises a motor configured to wind a seat belt provided in the vehicle; (for example, 37A-37D)

a first detection unit configured to detect a following vehicle while the vehicle is traveling; (for example, 31C, 32A, 32B)

a second detection unit configured to detect a preceding vehicle while the vehicle is traveling; (for example, 31A, 31B, 32A, 32B)

a determination unit configured to determine a risk that the following vehicle that is detected by the first detection unit will collide with the vehicle; and (for example, 202)

a control unit configured to control winding of the seat belt by changing a winding speed of the seat belt by the motor in a case when the determination unit determines that there is the risk. (for example, 202, 291)

According to this embodiment, the winding of the seat belt is controlled in accordance with the risk of an accident based on a surrounding situation of the vehicle. Accordingly, an injury value of an occupant, when a collision with the following vehicle occurs, can be reduced.

According to the above embodiment, in a case where the determination unit determines that there is the risk, when the second detection unit detects no preceding vehicle, the control unit winds the seat belt at a normal speed, and when the second detection unit detects the preceding vehicle, the control unit winds the seat belt at a faster speed than the normal speed. (for example, S13, S14, S17)

According to this embodiment, the winding speed of the seat belt is changed depending on the presence or absence of the preceding vehicle. Therefore, the seat belt control in accordance with the possibility of the occurrence of multiple accidents is conducted, so that the injury value of the occupant, when the multiple accident occurs, can be reduced.

According to the above embodiment, the vehicle further comprises a third detection unit configured to detect a collision with the vehicle, (for example, S15, acceleration sensor) wherein in a case where the determination unit determines that there is the risk and in a case where the second detection unit detects the preceding vehicle, the control unit winds the seat belt at the faster speed than the normal speed, and then when the third detection unit detects the collision with the vehicle by the following vehicle, the control unit winds the seat belt again. (for example, S16)

According to this embodiment, the seat belt that has been loosened due to the collision with the following vehicle can be wound again to more strongly restrain the occupant, so that preparation for multiple accidents can be made in a suitable manner.

According to the above embodiment, in a case where a time to collision with the vehicle by the following vehicle is equal to or smaller than a predetermined value, the determination unit determines that there is the risk that the following vehicle that is detected by the first detection unit will collide with the vehicle. (for example, S12, TTC)

According to this embodiment, the risk of the collision can be determined in a suitable manner, in accordance with the position and the speed of the following vehicle that have been acquired through the camera image and the measurements of the radar.

According to the above embodiment, even in a case where the determination unit determines that there is no risk, the control unit winds the seat belt in accordance with an inter-vehicle distance between the vehicle and the following vehicle. (for example, S181-S183)

According to this embodiment, regardless of the above TTC, while the tailgating or the like is being done, the seat belt can be wound in accordance with the inter-vehicle distance to such a vehicle, so that the preparation for the impact to be caused by the collision can be made.

According to the above embodiment, in a case where the inter-vehicle distance between the vehicle and the following vehicle falls within a predetermined distance, the control unit winds the seat belt to wind the seat belt at a faster speed, as the inter-vehicle distance becomes shorter. (for example, S181-S183)

According to this embodiment, regardless of the above TTC, while the tailgating or the like is being done, the seat belt can be wound faster, as the inter-vehicle distance to such a vehicle becomes shorter, so that the preparation for the impact to be caused by the collision can be made.

According to the above embodiment, in a case where the determination unit determines that there is no risk, the control unit intermittently winds the seat belt, in winding the seat belt. (for example, S182, S183)

According to this embodiment, while the tailgating or the like is being done, such a fact can be notified to the occupant in a suitable manner.

According to the above embodiment, in a case where an inter-vehicle distance between the vehicle and the preceding vehicle falls within a predetermined distance, the second detection unit detects the vehicle as the preceding vehicle with respect to the vehicle. (for example, S13)

According to this embodiment, excessive winding of the seat belt can be reduced.

According to the above embodiment, in a case where the vehicle and the preceding vehicle are located in an identical lane, when the inter-vehicle distance falls within a first distance, the second detection unit detects the vehicle as the preceding vehicle with respect to the vehicle, and in a case where the vehicle and the preceding vehicle are located in different lanes, when the inter-vehicle distance falls within a second distance that is shorter than the first distance, the second detection unit detects the vehicle as the preceding vehicle with respect to the vehicle. (for example, S13)

According to this embodiment, excessive winding of the seat belt can be reduced.

According to the above embodiment, the control unit changes tensile strength of the seat belt together with a winding speed of the seat belt.

According to this embodiment, the winding speed can be made faster, the torque can be enhanced, and the posture of the occupant can be corrected in a more effective manner.

The invention is not limited to the foregoing embodiments, and various variations/changes are possible within the spirit of the invention.

What is claimed is:

1. A vehicle comprising:
   a motor configured to wind a seat belt provided in the vehicle;
   camera sensors that images surrounding environment of the vehicle;
   a storage device that stores instructions; and
   at least one processor that executes the instructions to:
     detect a following vehicle while the vehicle is traveling using the camera sensors;
     detect a preceding vehicle while the vehicle is traveling using the camera sensors;
     determine a risk that the detected following vehicle will collide with the vehicle; and
     control winding of the seat belt by changing a winding speed of the seat belt by the motor in a case when it is determined that there is the risk,
   wherein the at least one processor executes instructions in the storage device to, in a case where it is determined that there is the risk,
     when the preceding vehicle is not detected, wind the seat belt at a first speed, and
     when the preceding vehicle is detected, wind the seat belt at a second speed faster than the first speed.

2. The vehicle according to claim 1, wherein the at least one processor executes instructions in the storage device to:
   detect a collision with the following vehicle, and
   in a case where it is determined that there is the risk and in a case where the preceding vehicle is detected, wind the seat belt at the second speed faster than the first speed, and then when the collision with the following vehicle is detected, wind the seat belt again.

3. The vehicle according to claim 1, wherein the at least one processor executes instructions in the storage device to:
   in a case where a time to collision with the vehicle by the following vehicle is equal to or smaller than a predetermined value, determine that there is the risk that the detected following vehicle will collide with the vehicle.

4. The vehicle according to claim 1, wherein the at least one processor executes instructions in the storage device to:
   even in a case where it is determined that there is no risk, wind the seat belt in accordance with an inter-vehicle distance between the vehicle and the following vehicle.

5. The vehicle according to claim 4, wherein the at least one processor executes instructions in the storage device to:
   in a case where the inter-vehicle distance between the vehicle and the following vehicle falls within a predetermined distance, wind the seat belt at a faster speed, as the inter-vehicle distance becomes shorter.

6. The vehicle according to claim 4, wherein the at least one processor executes instructions in the storage device to:
   in a case where it is determined that there is no risk, intermittently wind the seat belt, in winding the seat belt.

7. The vehicle according to claim 1, wherein the at least one processor executes instructions in the storage device to:
   in a case where an inter-vehicle distance between the vehicle and the preceding vehicle falls within a predetermined distance, detect the preceding vehicle as a target preceding vehicle with respect to the vehicle having the at least one processor.

8. The vehicle according to claim 7, wherein the at least one processor executes instructions in the storage device to:
   in a case where the vehicle and the preceding vehicle are located in an identical lane, when the inter-vehicle distance falls within a first distance, detect the preceding vehicle as the target preceding vehicle with respect to the vehicle having the at least one processor, and
   in a case where the vehicle and the preceding vehicle are located in different lanes, when the inter-vehicle distance falls within a second distance that is shorter than the first distance, detect the preceding vehicle as the target preceding vehicle with respect to the vehicle having the at least one processor.

9. The vehicle according to claim 1, wherein the at least one processor executes instructions in the storage device to:
   change a tension of the seat belt together with the winding speed of the seat belt.

10. A control method of a motor seat belt provided in a vehicle, the control method comprising:
   detecting a following vehicle while the vehicle is traveling;
   detecting a preceding vehicle while the vehicle is traveling;
   determining a risk that the following vehicle that is detected in the detecting the following vehicle will collide with the vehicle; and
   controlling winding of a seat belt by changing a winding speed of the seat belt by a motor in a case when the determining determines that there is the risk,
   wherein the controlling winding of the seat belt includes:
   in a case where it is determined that there is the risk,
      when the preceding vehicle is not detected, winding the seat belt at a first speed, and
      when the preceding vehicle is detected, winding the seat belt at a second speed faster than the first speed.

\* \* \* \* \*